United States Patent [19]

Ruuska

[11] 4,231,186
[45] Nov. 4, 1980

[54] GROUP OF POTS FOR NURSING AND REPLANTING PLANTS

[75] Inventor: Mauno Ruuska, Säkylä, Finland

[73] Assignee: Lannen Tehtaat Oy, Iso Vimma, Finland

[21] Appl. No.: 30,007

[22] Filed: Apr. 16, 1979

Related U.S. Application Data

[63] Continuation of Ser. No. 804,568, Jun. 8, 1977, abandoned.

[30] Foreign Application Priority Data

Jun. 9, 1976 [FI] Finland .................................. 761655

[51] Int. Cl.³ ............................................. A01G 23/02
[52] U.S. Cl. ............................................ 47/74; 47/78;
111/2; 428/118; 428/913; 493/91; 493/110;
493/966
[58] Field of Search ................. 47/66, 67, 72, 73, 74,
47/75, 77, 78, 84, 85, 86, 87; 428/117, 511, 913,
284, 287, 476, 481, 296, 298, 297, 299, 118, 913;
111/2, 3; 93/1

[56] References Cited

U.S. PATENT DOCUMENTS

| | | | |
|---|---|---|---|
| 2,022,548 | 11/1935 | Otwell | 47/86 |
| 2,688,209 | 9/1954 | Adams | 47/74 |
| 3,018,205 | 1/1962 | Barut | 47/85 X |
| 3,164,507 | 1/1965 | Masuda | 47/77 X |
| 3,375,607 | 4/1968 | Melvold | 47/86 X |
| 3,515,036 | 6/1970 | Oki et al. | 47/77 X |
| 3,524,279 | 8/1970 | Adams | 47/77 X |
| 3,557,489 | 1/1971 | Ferrand | 47/87 |
| 3,661,682 | 5/1972 | Shoji et al. | 47/77 |
| 3,798,837 | 3/1974 | Oehmke et al. | 47/77 |
| 3,837,995 | 9/1974 | Floden | 428/298 |
| 3,888,042 | 6/1975 | Bourne | 47/74 |
| 4,081,582 | 3/1978 | Butterworth et al. | 428/298 |

FOREIGN PATENT DOCUMENTS

| | | | |
|---|---|---|---|
| 729870 | 12/1942 | Fed. Rep. of Germany | 47/74 |
| 1675487 | 1/1971 | Fed. Rep. of Germany . | |
| 1757922 | 9/1973 | Fed. Rep. of Germany . | |
| 2129498 | 10/1974 | Fed. Rep. of Germany . | |
| 49233 | 6/1975 | Finland | 47/74 |
| 158458 | 8/1971 | Hungary . | |
| 166852 | 10/1976 | Hungary . | |
| 1012983 | 12/1965 | United Kingdom | 47/77 |
| 217311 | 9/1968 | U.S.S.R. . | |

Primary Examiner—Edgar S. Burr
Assistant Examiner—James R. Feyrer
Attorney, Agent, or Firm—Bierman & Bierman

[57] ABSTRACT

A group of enclosures for nursing and replanting plants is disclosed comprising several parallel rows of enclosures wherein each two adjoining rows of enclosures have a common wall construction. This wall permits the flow of nutrients and water through the wall and thus makes it possible to control and guide the growth of the roots.

8 Claims, 6 Drawing Figures

GROUP OF POTS FOR NURSING AND REPLANTING PLANTS

The instant case is a Continuation of co-pending U.S. Ser. No. 804,568 filed June 8, 1977, now abandoned, which claims the priority of Finnish Ser. No. 761,655 filed June 9, 1976.

The present invention concerns a group of enclosures for nursing and replanting plants. This group of enclosures comprises several parallel lines of enclosures wherein each two adjoining rows of enclosures have a common wall construction. This wall is split during nursing of the plants because the middle part of the wall consists of a material which can readily decompose when exposed to water and soil. Such materials include cardboard and paper which is capable of decomposing under such conditions.

The invention is particularly concerned with the wall material of the root cake. A proper selection of the wall material makes it possible to control and guide the growth of the roots in the cake in a direction favorable for replanting.

Sheet-shaped or tape-shaped growing systems for cake plants are known in which the wall of the cake consists of plastic or a plastic-reinforced paper which prevents the roots from growing through the wall. The method of growing using a wall containing plastic is disadvantageous because the plastic must be removed prior to replanting. A brittle plastic film may fragment during the mechanical handling of the plastic enclosures. This can result in the breakdown of the nursing and replanting machines. In severe cases, this can have a detrimental effect on the growth of the plant itself. Moreover, especially in the case of cakes with unperforated plastic walls, the plastic prevents the flow of liquid between the cakes. This flow is necessary to balance water and nutrient distribution between the cakes which require extremely precise fertilizing and watering methods.

The use of a plastic film causes additional serious problems. For example, when the roots contact the film they attempt to bypass it which results in twisted roots which may ultimately suffer serious deformities. This can hamper the growth of the root and the plant.

The object of the present invention is to overcome the aforementioned drawbacks associated with the prior art methods. The group of enclosures in accordance with this invention is characterized as having enclosures with a wall construction which is capable of splitting. Each wall comprises an interior layer of cardboard, special paper, or other decomposable material. A non-woven fabric consisting of a highly porous network of artificial fiber is glued or laminated on the sides of the interior layer. This non-woven fabric must be capable of slowly decaying in the ground or at least at a slower rate than the interior layer. The layers of non-woven fabric, laminated on both sides of the interior layer of the wall construction, are permanently fixed to each other at one end of the wall constuction. Thus, the fastening points of the non-woven fabric at the ends of two adjoining walls are always placed at opposite sides of the group of enclosures. This provides for, after the nursing stage, a group of enclosures constituting an enclosure band continuing throughout the entire handling batch.

As compared with plastic-reinforced paper, an advantage of the present wall material is its ease of manufacture. Additionally, a smaller amount of artifical fiber is required because only a thin layer of this material is required on the surface of the wall. Moreover, a non-woven fabric almost exclusively containing artifical fibers can be cross-linked to the desired strength with a considerably lower quantity of fibers than in an artifical fiber reinforced paper web. In this case, the amount of artifical fibers is distributed evenly over the entire length of the web. This is because the amount of natural fiber disturbs the construction of the fiber network.

The following drawings, and the embodiment shown therein, are for the purpose of illustration only and are not meant to limit or in any way redefine the invention as claimed in the generic claim of this application. In the accompanying drawings, constituting a part thereof, and in which like reference characters indicate like parts, FIGS. 1 and 2 are side views of equipment for the manufacture of the group of enclosures.

Figure 1:
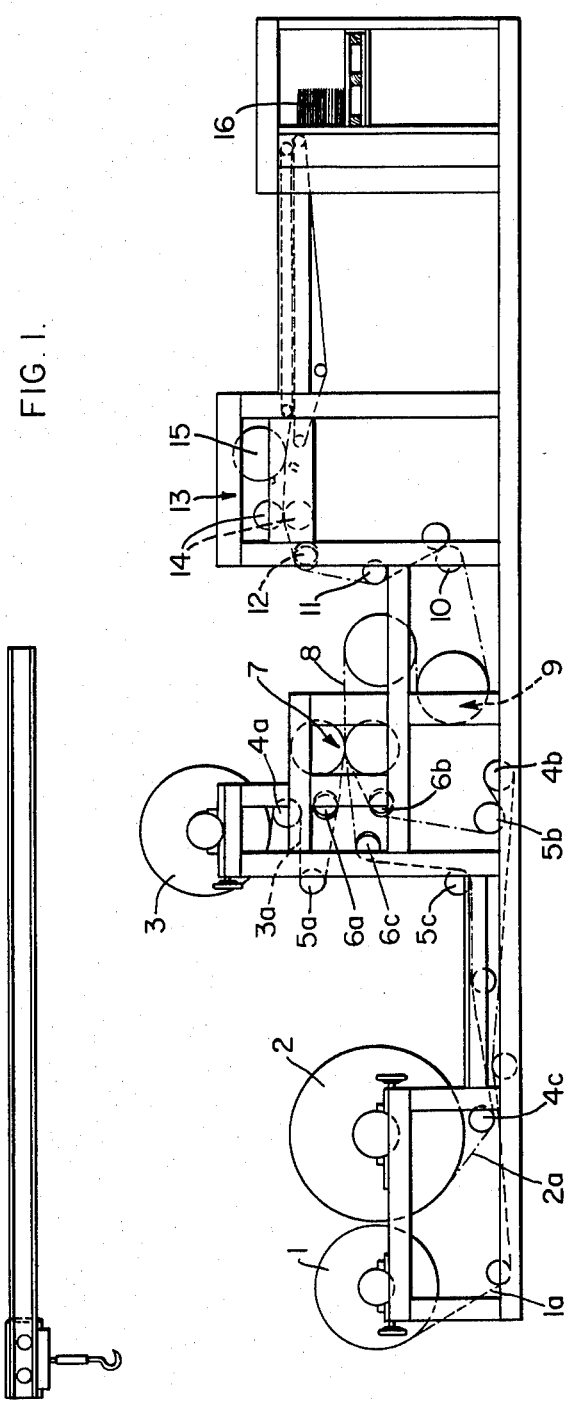

As shown in FIG. 1, the unrolling of the non-woven fabric takes place from rolls 1 and 3, and the unrolling of the special paper from roll 2. Webs 1a, 2a, and 3a are each passed over their respective guide rollers 4a–c, 5a–c, and 6a–c to lamination station 7.

At lamination station 7, the three webs 1a, 2a, and 3a are joined together by a known method using either a gluing, heating, or ultrasound technique or any other laminating technique. The resulting laminate 8 is passed over cooling station 9 and guide rollers 10, 11, and 12 to cutting station 13 where the clean-cutting of the edges of laminate 8 is performed. Cutting station 13 comprises aligning roller 12, drive roller 14, and cutter 15.

Laminate 8 is cut into sheets and piled into pallets 16 by a known method for the purpose of switching the fiber direction. Cutting into sheets need not be performed on non-woven fabrics whose strength ratio (machine direction to transverse direction) is approximately 1. However, from this step, it is possible to proceed straight to joining the chain-joint material with the laminate.

Figure 2:
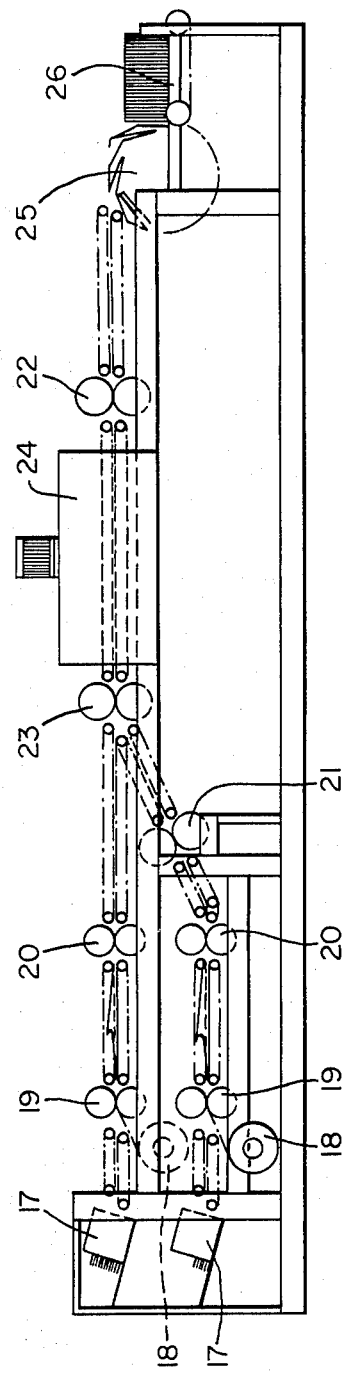
Figure 3:
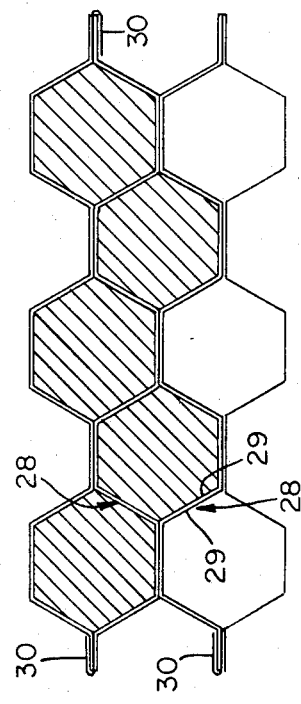
FIG. 3 is a top view of a part of a group of enclosures when it is pulled open.
Figure 4:
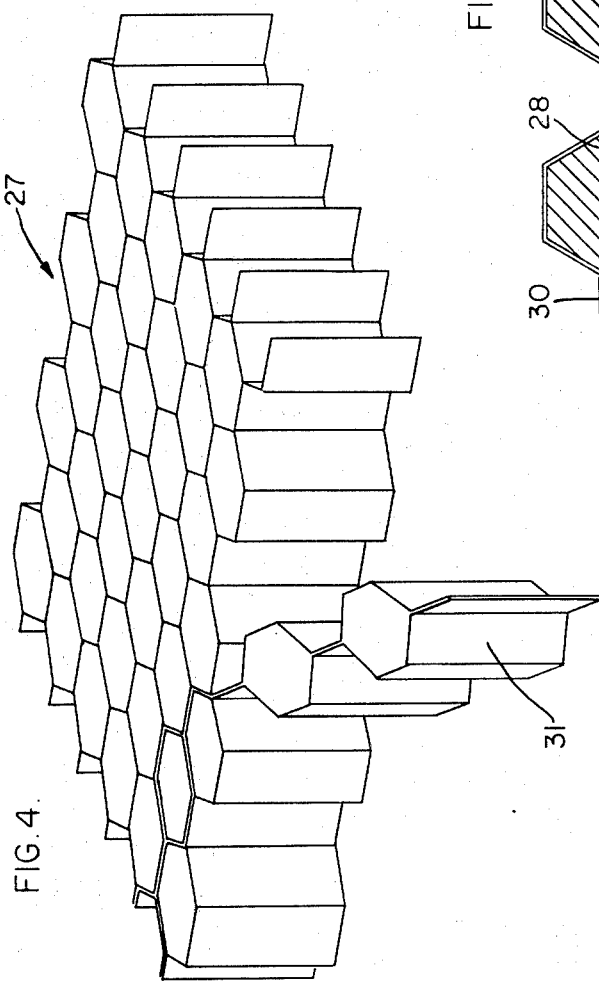
FIG. 4 is an axonometric view of a group of enclosures which has, during the nursing period, been formed into a row of enclosures continuous throughout the entire handling batch.

As shown in FIG. 2, the laminate sheets are supplied, by a known method, to the manufacturing line so that the fiber direction in the non-woven fabric is aligned with the direction of the unloading of the sheet. The sheet supply device is designated as 17.

Chain-joint material 18, which is paper coated with a known hot-jointable tough plastic material such as polyethylene, polypropylene etc., is first laminated to the border of the bottom face of the laminate sheet by means of a disk hot-jointer 19 or by any other known method. Then, the material 18 is forced, by means of a known method, 180° over the edge of the laminate sheet and the lamination of the border of the upper face takes place by the method corresponding to the lamination of the bottom face at 20. This operation permits the formation of a chain joint band which runs the entire length of the border of the laminate sheet. One chain joint band 18 permits the opening of the entire sheet into a continuous row when the first enclosure is pulled. The chain joint band 18 on the upper track is laminated to the left edge of the laminate and on the above described lower track to the right edge, or vice versa.

Figure 5:
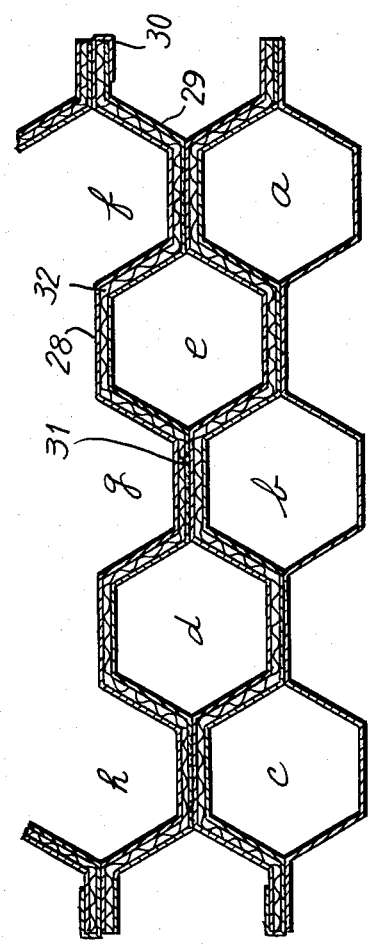
FIG. 5 is a top view of a part of a group of enclosures, before the decomposing of the middle part of the wall.

The lamination of the upper track and lower track to each other takes place by means of adhesive stripes 31 (FIG. 5). The adhesive stripe can be produced by means of a cold gluing technique (in which the laminate must pass through a drying tunnel before further treatment), a hot-melt technique, a hot-jointing technique, an ultrasound technique, etc. The adhesive stripe 31 must be definitely insoluble in water and non-decaying. By varying the width and positions of the adhesive stripe, it is possible to produce enclosure systems having different forms and diameters.

Prior to the preparation of the adhesive stripe, a device is preferably employed to cause the omission of the adhesive operation if the sheet fails to arrive from either the upper or lower track. The unlaminated sheet is passed from the line and is discarded or recycled.

Either glue or hot-melt glue is again supplied onto the multi-layer laminate by means of a known technique. If the mulit-layer laminate is a web, it is cut off and the sheets are piled on top of each other. The sheets are then glued to each other while, depending on the gluing patterns, either square on hexagonal enclosures are formed when the sheet is opened.

FIG. 2 shows additonal members of the enclosures forming equipment. These members include gluing equipment 21 and 22, laminating pinch 23, drying tunnel 24, sheet stacker 25, and stacking table 26.

Figure 6:
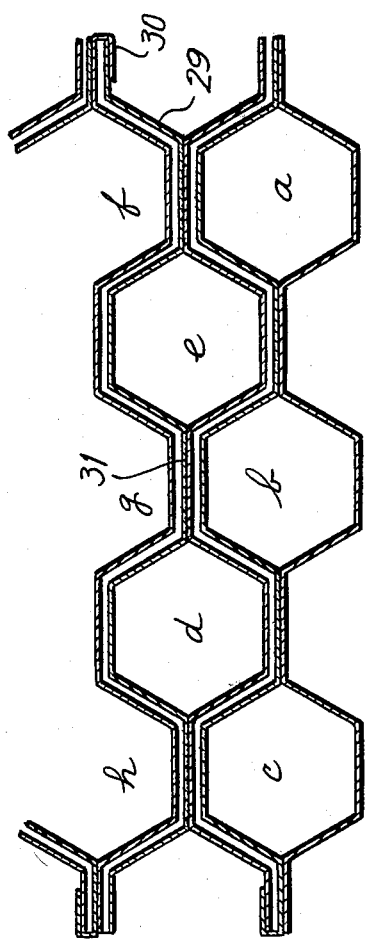
FIG. 6 is the top view of FIG. 5 after the middle part of the wall has decomposed.

Thus, a finished group of enclosures comprises several parallel rows, each two adjoining rows having a common wall construction 28 which splits during the nursing period. It is characteristic of the wall constrction that layers 29 of non-woven fabric that constitute the border faces of the cakes are connected to each other so that during the nursing period the joint 32 loses its adhesive quality. Once this occurs, layers 29 of non-woven fabric are only fastened to each other at one end (i.e. at the chain joint point 30). The above adhesive joint 32 between layers 29 of non-woven fabric may consist of glue, or a decaying intermediate layer such as paper or cardboard, etc. Chain joint 30 of layers 29 may be produced by folding layers 29 against each other out of the same blank or by joining two separate layer blanks 29 together by means of a generally known joining method so that the joint is durable even after nursing. When the intermediate layer 32 has decomposed, the enclosures a–h form a band continuing throughout the entire batch (FIG. 6).

The wall material 28 of the cake preferably consists of special paper 32 on whose sides a non-woven fabric 29 is laminated. The significance of the paper in the laminate is to give the non-woven fabric 29, at the manufacturing stage of the enclosure system 27, sufficient density, strength, and rigidity and, at the filling and sowing stage, the strength and rigidity required by highly automated mechanical handling.

The paper 32, whose rate of decay can be controlled, binds the substances controlling the growth of the roots for the period of the decay resistance of the paper. The substance controlling the growth of the roots stops the growth of the tip of the root when it approaches the paper layer. This results in branching of the root and an active root system wherein an abundant number of roots are present in the root cake. This root system is necessary to insure successful replanting.

Thus, the substances controlling the growth of the roots limit the growth of roots from one cake to another. This is necessary in mechanical nursing and planting to avoid breaking roots when the cakes are separated. At the same time, any damage to the root system is also eliminated.

On the other hand, the non-woven fabric 29, which includes a known artificial fiber, such as polypropene, polyamide, polyester, polyacrylonitrile, or polyvinylalcohol fibers etc. is a highly porous network of artifical fibers interconnected by gluing or by any other method and which slowly decays in the ground. It allows the wall material 28 to keep the cake bound together after nursing of the plant since the paper 32 has already lost all of its strength.

Decomposition of the cellulose in the paper 32 can be programmed in advance and the effect of the substances controlling the growth of the roots can be terminated at the same time. The highly porous non-woven fabric 29 permits the roots of the plant to grow through the fabric in accordance with a growing program planned in advance (i.e. at the time of planting or immediately thereafter). The non-woven fabric 29 gives the bands of cake plants sufficient strength for extensive handling in an automated mechanical nursing and planting treatment.

I claim:

1. A group of adjoining enclosures for nursing and replanting plants comprising a plurality of parallel rows of enclosures, each of said enclosures formed by the union of two wall layers of non-woven fabric consisting essentially of a highly porous network of artificial fiber, and separated in the region between adjoining enclosures in one row by said wall layers superimposed and permanently bound to each other, one of said wall layers of one parallel row separated from an adjacent wall layer of an adjacent parallel row by an intermediate layer of decomposable material laminated to the outer layers of non-woven fabric to form a laminated wall construction, said outer fabric layers of the laminated wall construction being decomposable upon exposure to soil and water during the nursing stage of said plants at a slower rate than said intermediate layer, and wherein the ends of the outer layers at one end of each laminated wall construction are permanently fastened to each other, and wherein the fastening points of the laminated wall constructions at the ends of two adjoining wall constructions are always placed at opposite sides of the group of enclosures so that a single chain of enclosures is formed after said intermediate layer has decomposed.

2. The group of enclosures of claim 1 wherein said ends of the outer fabric layers at one end of each laminated wall construction are connected to each other by plastic material selected from the group consisting of polyethylene and polypropylene.

3. The group of enclosures of claim 1 wherein the artificial fiber is selected from the group consisting of polypropene, polyamide, polyester, polyacrylonitrile, and polyvinylalcohol.

4. The group of enclosures of claim 1 wherein said intermediate layer is selected from the group consisting of paper and cardboard.

5. An array of adjoining enclosures for nursing plants, comprising:

a plurality of composite walls, each formed of an intermediate layer of decomposable material laminated between a pair of opposed outer layers of non-woven fabric consisting essentially of a highly porous network of artificial fiber, said plural composite walls each being of a substantially equal, predetermined length and positioned in end-to-end, coterminous alignment with each other to delineate substantially parallel rows of plural plant-nursing cells, said array including first lengthwise portions of the facingly-disposed outer fabric layers of adjacent ones of said composite walls predeterminately spaced from one another to define and bound individual ones of the plural cells in a row, and second lengthwise portions of the facingly-disposed outer fabric layers of adjacent ones of said composite walls relatively permanently bonded to each other at locations alternatingly between said first portions to separate adjacent cells in the row, fastening means at one longitudinal end of each of said composite walls non-decomposably connecting the two outer fabric layers of the wall to each other, whereby a plurality of rows of nursing cells may be removed as a single unit, adjacent ones of said composite walls being disposed in said array such that said fastening means of each said wall is located at the opposite side of said array with respect to the fastening means of the next adjacent one of said walls, said fabric being decomposable upon exposure to soil and water at a rate slower than said intermediate layer so that on decomposition of the intermediate layer of said composite walls a single, continuous chain of plant-nursing cells is formed of said array.

6. The array according to claim 5 wherein said fastening means is formed of a plastic material selected from the group consisting of polyethylene and polypropylene.

7. The array according to claim 5 wherein said artificial fiber is selected from the group consisting of polypropene, polyamide, polyester, polyacrylonitrile, and polyvinylalcohol.

8. The array according to claim 5 wherein said intermediate layer is selected from the group consisting of paper and cardboard.

* * * * *